United States Patent
Wright (10) Patent No.: US 11,486,501 B2
(45) Date of Patent: Nov. 1, 2022

(54) VARIABLE LOAD VALVE ACTUATOR (71) Applicant: Halliburton Energy Services, Inc., Houston, TX (US)

(72) Inventor: Adam Davis Wright, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/289,031

(22) PCT Filed: Dec. 13, 2018

(86) PCT No.: PCT/US2018/065383
§ 371 (c)(1),
(2) Date: Apr. 27, 2021

(87) PCT Pub. No.: WO2020/122914
PCT Pub. Date: Jun. 18, 2020

(65) Prior Publication Data
US 2021/0404560 A1    Dec. 30, 2021

(51) Int. Cl.
*F16K 5/06*      (2006.01)
*E21B 34/14*    (2006.01)
(Continued)

(52) U.S. Cl.
CPC ........... *F16K 5/0647* (2013.01); *E21B 34/14* (2013.01); *F16K 31/52458* (2013.01); *F16K 31/563* (2013.01); *E21B 2200/04* (2020.05)

(58) Field of Classification Search
CPC ...... E21B 34/10; E21B 34/101; E21B 34/102; E21B 34/108; E21B 34/14; E21B 34/142; E21B 2200/04; F16K 5/0647; F16K 31/52458; F16K 31/563; F16K 31/52; F16K 31/522; F16K 31/5284; F16K 31/56
(Continued)

(56) References Cited

U.S. PATENT DOCUMENTS 3,398,762 A * 8/1968 Fredd .................... F16K 31/445
137/495
4,619,320 A * 10/1986 Adnyana ................. E21B 34/06
166/66.7
(Continued)

FOREIGN PATENT DOCUMENTS

WO    2017204801 A1    11/2017

*Primary Examiner* — Kevin F Murphy
*Assistant Examiner* — Jonathan J Waddy
(74) *Attorney, Agent, or Firm* — John Wustenberg; Parker Justiss, P.C.

(57) ABSTRACT

Embodiments of an equalizing device for use with a safety valve and a safety valve are provided herein. In one embodiment, the equalizing device includes at least a tubular having a central bore extending axially there through, the tubular having a ball seat. The equalizing device may further include a ball positioned proximate the ball seat, the ball configured to move from a first position engaged with the ball seat to a second position disengaged from the ball seat to equalize pressure across the safety valve, and an arced ring positioned radially outside the ball, the arced ring configured to keep the ball engaged with the ball seat when in the first position and maintain the ball radially outside the ball seat when in the second position.

20 Claims, 7 Drawing Sheets

(51) Int. Cl.
*F16K 31/524* (2006.01)
*F16K 31/56* (2006.01)

(58) Field of Classification Search
USPC .......................................... 166/334.2; 251/75
See application file for complete search history.

(56) References Cited

U.S. PATENT DOCUMENTS

| | | | |
|---|---|---|---|
| 7,637,324 B2 | 12/2009 | Anderson et al. | |
| 9,388,665 B2 | 7/2016 | Caminari | |
| 2004/0084190 A1* | 5/2004 | Hill | E21B 34/08 |
| | | | 166/386 |
| 2004/0163820 A1* | 8/2004 | Bishop | E21B 34/06 |
| | | | 166/373 |
| 2008/0128137 A1 | 6/2008 | Anderson et al. | |
| 2009/0266556 A1* | 10/2009 | Swenson | E21B 23/02 |
| | | | 166/373 |
| 2010/0206579 A1 | 8/2010 | Guven et al. | |
| 2013/0220624 A1* | 8/2013 | Hill, Jr. | E21B 34/10 |
| | | | 166/321 |
| 2014/0020955 A1* | 1/2014 | Cramer | E21B 34/10 |
| | | | 175/317 |
| 2016/0168949 A1* | 6/2016 | Anton | E21B 34/14 |
| | | | 166/321 |

\* cited by examiner

VARIABLE LOAD VALVE ACTUATOR

CROSS-REFERENCE TO RELATED APPLICATION

This application is the National Stage of, and therefore claims the benefit of, International Application No. PCT/US2018/065383 filed on Dec. 13, 2018, entitled "VARIABLE LOAD VALVE ACTUATOR," which was published in English under International Publication Number WO 2020/122914 on Jun. 18, 2020. The above application is commonly assigned with this National Stage application and is incorporated herein by reference in its entirety.

TECHNICAL FIELD

This application is directed, in general, to a valve and, more specifically, to a valve actuator for use with a valve, and a method of operating a valve actuator.

BACKGROUND

Operations performed and equipment utilized in conjunction with a subterranean production often require one or more different types of valves. One such valve is a ball valve. A ball valve is a type of valve that uses a spherical ball as a closure mechanism. The ball has a hole therethrough that is aligned with the direction of flow when the valve is opened and misaligned with the direction of flow when the valve is closed.

Ball valves have many applications in well tools for use downhole in a wellbore, for example, as formation tester valves, safety valves, and in other downhole applications. Many of these well tool applications use a ball valve because ball valves can have a large through bore for passage of tools, tubing strings, and flow, yet may also be compactly arranged. For example, ball valves may have a cylindrical outer profile that corresponds to the cylindrical outer profile of the remainder of the string carrying the ball valve into the well bore, thus presenting few or no protrusions to hang up on the interior of the well.

When the ball is in the "closed" position, it typically seals against a seat and does not allow fluid to pass through it. When the ball is in the "open" position (e.g., rotated through an angle of about 90°), it allows fluid to pass through it. Debris and/or other objects may be present in an open valve. As the valve begins to close, the debris and/or other objects therein may cause problems with the valve fully closing. Therefore, there exists a need for a valve actuator or ball valve that can better handle the debris and/or other objects.

BRIEF DESCRIPTION

Reference is now made to the following descriptions taken in conjunction with the accompanying drawings, in which.

DETAILED DESCRIPTION

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally toward the surface of the formation; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical axis. Unless otherwise specified, use of the term "subterranean formation" shall be construed as encompassing both areas below exposed earth and areas below earth covered by water such as ocean or fresh water.

The description and drawings included herein merely illustrate the principles of the disclosure. It will thus be appreciated that those skilled in the art will be able to devise various arrangements that, although not explicitly described or shown herein, embody the principles of the disclosure and are included within its scope.

Figure 1:
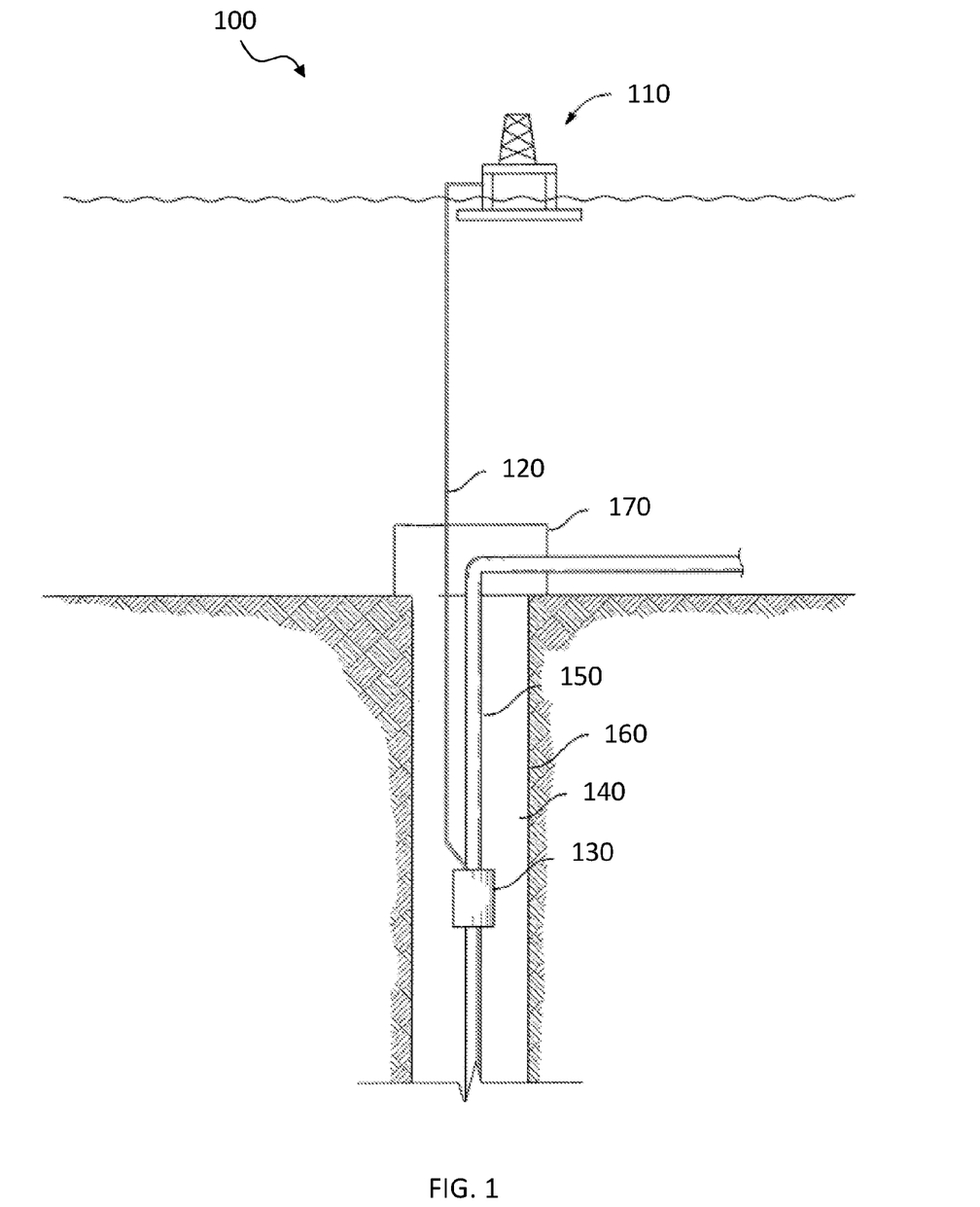
FIG. 1 illustrates a subterranean production well employing a valve having a valve actuator constructed according to the principles of the present disclosure.

FIG. 1 illustrates a subterranean production well 100, including an offshore platform 110 connected to a valve 130, such as a safety valve, via fluid/electrical connection 120. While the fluid/electrical connection 120 may include one or both of a fluid connection and/or electrical connection, in many embodiments consistent with the disclosure the connection 120 provides only a fluid connection (e.g., a hydraulic open line and a hydraulic closed line). An annulus 140 may be defined between walls of well 160 and a conduit 150. Wellhead 170 may provide a means to hang off and seal conduit 150 against well 160 and provide a profile to latch a subsea blowout preventer to. Conduit 150 may be coupled to wellhead 170. Conduit 150 may be any conduit such as a casing, liner, production tubing, or other tubulars disposed in a wellbore.

The valve 130 may be interconnected in conduit 150 and positioned in the well 160. The valve 130 may be any type of valve, including a ball valve or linear valve, among others, and remain within the purview of the disclosure. Accordingly, the valve 130 should not be limited to any specific type of valve. Although the well 160 is depicted in FIG. 1 as an offshore well, one of ordinary skill should be able to adopt the teachings herein to any type of well including onshore or offshore. The fluid/electrical connection 120 may extend into the well 160 and may be connected to the valve 130. The fluid/electrical connection 120 may provide actuation and/or de-actuation of the valve 130. Actuation may comprise opening the valve 130 to provide a flow path for wellbore fluids to enter conduit 150, and de-actuation may comprise closing the valve 130 to close a flow path for wellbore fluids to enter conduit 150.

Figure 2:
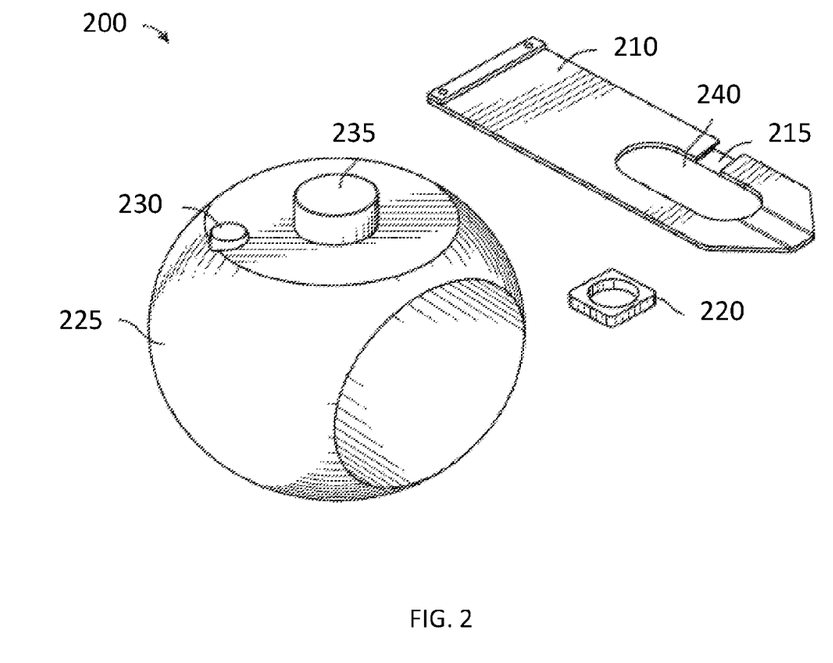
FIG. 2 illustrates certain elements of a ball valve that might employ a valve actuator according to the principles of the present disclosure, as may be employed in FIG. 1.

Turning to FIG. 2, illustrated are certain elements of a ball valve 200 that might employ a valve actuator according to the principles of the present disclosure. As seen in FIG. 2, the ball valve 200 may include, in simple terms with only one of each element shown, a control arm 210 with slots 215, ball arm bushings 220, and a rotating ball member 225 with pivot pins 230 on either side that are accommodated by the slots 215 on the control arm 210 and the bushing 220. The ball member 225, in this embodiment, includes mounting pivot pins 235 to mount the control arm 210 in the mounting slot 240.

Figure 3A:
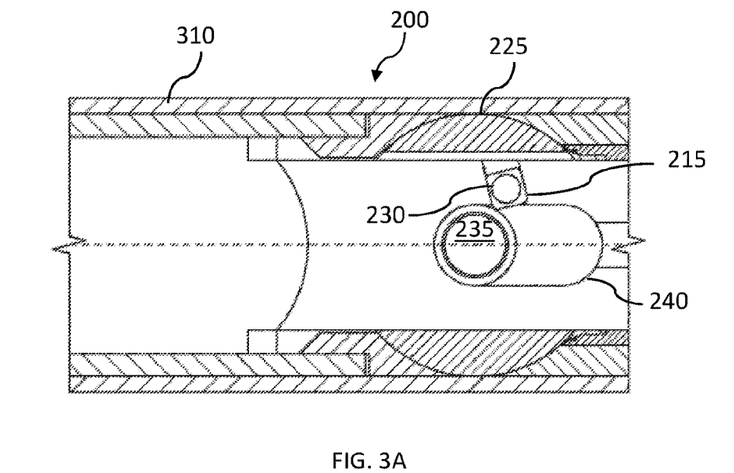
FIG. 3A is a section view of the ball valve of FIG. 2 in a valve body and in an "open" position.
Figure 3B:
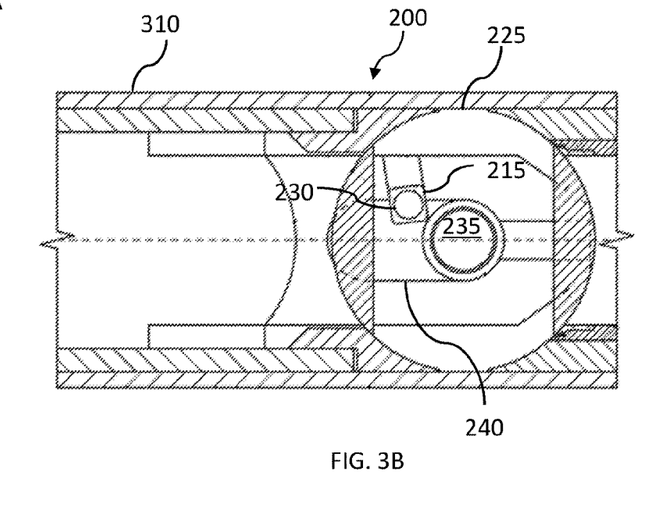
FIG. 3B is a section view of the ball valve of FIG. 2 in the valve body and in a "closed" position.

Turning to FIGS. 3A and 3B, illustrated is a section view of the elements of the ball valve of FIG. 2 housed within a valve body 310. FIG. 3A illustrates the valve in an "open" open position, whereas FIG. 3B illustrates the valve in a "closed" position. Valve bodies 310 are shown in FIGS. 3A and 3B, and may be made up of multiple parts for convenience of construction, and in other instances, may be made of fewer or more parts. For example, in one embodiment, the valve body 310 may include an outer and inner mandrel, of which are configured to slide relative to one another. The ends of the valve body 310 may be configured to couple to other components of a completion string (e.g., threadingly and/or otherwise). The ball member 225, in the embodiment shown, rotates about an axis transverse to the longitudinal axis of the valve body 310. The ball valve 200 is open when the central passage of the ball member 225 aligns with and coincides with the central passage of the valve body 310, such as shown in FIG. 3A. The ball valve 200 is closed when the central passage of the ball member does not coincide with, and seals against passage of fluid and pressure through the central passage of the valve body 310, such as shown in FIG. 3B.

The pivot pin 230 may be any shape that can slide in slot 215 on control arm 210 and/or accept a bushing 220. In an embodiment, the pivot pin 230 is circular. The bushing 220 may be any shape that fits onto the pivot pin 230 and slides in the slot 215 on the control arm 210. In an embodiment, the bushing 220 is square or rectangular in shape.

In an embodiment, the "load path" to open the rotating ball member 225 begins with an axial load being produced, for example by a valve actuator according to the disclosure, and transferred to the control arms 210 and slots 215. In one embodiment, the control arms 210 and slots 215 are limited to linear/axial travel only. From the slots 215, the load is transferred onto the bushings 220 located and sliding within the slots 215, and then onto the pivot pins 230 on either side of the rotating ball member 225. The load and resulting motion creates the rotation of the rotating ball member 225 required to open the path for flow through the ball valve. Those skilled in the art understand that certain embodiments, such as those according to the disclosure, may use fluid provided from the surface to hydraulically operate, as well as a collection of springs, to open and close the rotating ball member 225. Those skilled in the art further understand that while the valve 200 is illustrated as a ball valve, other types of valves (e.g., including linear type valves) are within the scope of the present disclosure.

Turning now to FIGS. 4A-4E, there is shown a valve actuator 400, which may be used in conjunction with a valve, such as ball valve 200. The valve actuator 400, in the particular embodiment shown, includes an outer mandrel 405 and an inner mandrel 430, of which are configured to axially slide relative to one another. Together, the outer mandrel 405 and the inner mandrel 430 define a spring chamber 460, which in some embodiments, may be separated into a first portion 465 and a second portion 470. The inner mandrel 430, in one example, could be coupled to a control arm of a valve, such as the control arm 210 of the valve 200 illustrated in FIGS. 2, 3A and 3B.

In the embodiment shown in FIGS. 4A-4E, an expandable ring 475 separates the spring chamber 460 into the first and second portions 465, 470. The expandable ring 475, in some embodiments, may be a segmented ring positioned about a wedge block, and constructed from metal or another similar material. As will be illustrated in greater detail below, the expandable ring 475 should be manufactured such that it can radially expand (e.g., in all directions) when necessary. Notwithstanding, the expandable ring 475 may comprise other configuration and materials while remaining within the purview of the disclosure. In some embodiments, the valve actuator 400 may include a plurality of seals 490, which seal the spring chamber 460 from any outside fluids or debris, and/or define a hydraulic working area.

In this embodiment, the outer mandrel 405 has an outer notch 410 in its inner radial surface 415. The outer notch 410, in certain embodiments, has multiple sidewalls. In the embodiment shown, the outer notch has at least a first outer sidewall 420 and a second outer sidewall 425. The first outer sidewall 420, in the embodiment shown is positioned more distal the valve, whereas the second outer sidewall 425 is positioned more proximate the valve (e.g., relatively speaking). In some embodiments, the first outer sidewall 420 may be substantially perpendicular (at or about a 90° angle) relative to the inner radial surface 415. In other embodiments, the first outer sidewall 420 may be angled toward the valve 200 (e.g., toward the ball member 225). In this embodiment, the second outer sidewall 425 is substantially perpendicular with the first outer sidewall 420, but in other embodiments the second outer sidewall 425 may not be perpendicular with the first outer sidewall 420. The term substantially perpendicular, as used in this paragraph, means that the first and/or second outer sidewalls 420, 425 are within about 10 degrees from perfectly perpendicular. Other embodiments may exist wherein one or both of the first or second outer sidewalls 420, 425 are ideally perpendicular, which means that one or both of the first and/or second outer sidewalls 420, 425 are within about 5 degrees from perfectly perpendicular.

The inner mandrel 430, in this embodiment, likewise has an inner notch 435 in its outer radial surface 440. The inner notch 435, in certain embodiments, has multiple sidewalls. In the embodiment shown, the inner notch 435 has at least a first inner sidewall 445 and a second inner sidewall 450. The first inner sidewall 445, in the embodiment shown is positioned more distal the valve, whereas the second inner sidewall 450 is positioned more proximate the valve (e.g., relatively speaking). In accordance with one embodiment of the disclosure, the first inner sidewall 445 may be angular, and in this embodiment, angled away from the valve 200 and toward the first spring 480. For example, the first inner sidewall 445 might have an angle θ (e.g., relative to a plane parallel to the axial surface of the inner mandrel 430) ranging from about 45 degrees to about 85 degrees. In some embodiments, the second inner sidewall 450 may also be angular, for example also angled away from the valve 200 and toward the first spring 480. In the illustrated embodiment, the first and second inner sidewalls 445, 450 oppose one another and are substantially parallel with one another. The term substantially parallel, as used in this paragraph, means that the first and/or second inner sidewalls 445, 450 are within about 10 degrees from perfectly parallel. Other embodiments may exist wherein one or both of the first or second inner sidewalls 445, 450 are ideally parallel, which means that one or both of the first and/or second inner sidewalls 445, 450 are within about 5 degrees from perfectly parallel.

In one embodiment, the expandable ring 475 may have an outer segmented ring and an inner segmented ring positioned between a wedge block. In one embodiment, the outer segmented ring may be similar in shape to the outer notch 410 and its sidewalls 420, 425. In the embodiment shown, the inner expandable ring is likewise shaped similarly to the inner notch 435, wherein the inner expandable ring is shown having an angle substantially parallel to the first and/or second inner sidewalls 445, 450. The corresponding angles for the expandable ring 475 and the inner notch 435 helps assist the expandable ring 475 to transition from the inner notch 435 and the outer notch 410 as the inner mandrel 430 moves axially relative to the outer mandrel 405.

Figure 4A:
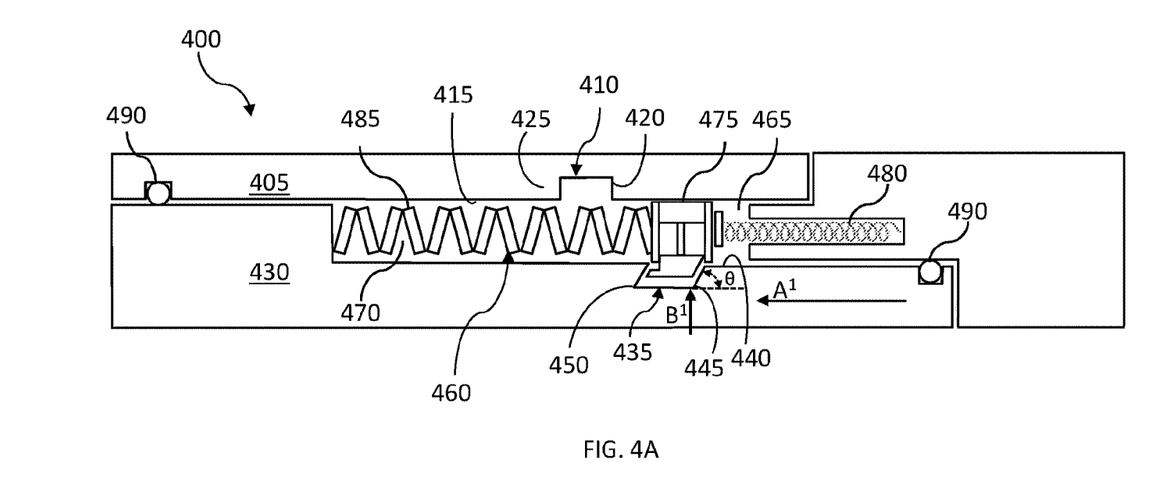
FIGS. 4A-4E illustrate section views of a valve actuator constructed according to the principles of the present disclosure at different operational states.

A first spring 480 (e.g., or set of springs in one embodiment) is positioned within the first portion 465 and a second spring 485 (e.g., or set of springs in one embodiment) is positioned within the second portion 470. When the valve actuator 400 is triggered by an event such as, e.g., loss of hydraulic power on one side of valve 200, the first spring 480 and second spring 485 are configured to sequentially extend to move a control arm, such as control arm 210, to close the valve 200. FIG. 4A shows the valve actuator 400 at a first stage of operation wherein the valve 200 is open. In the particular embodiment shown in FIG. 4A, hydraulic pressure on the valve side of the valve actuator 400 presses the inner mandrel 430 axially inward toward the outer mandrel 405, and thus compresses the first and second springs 480, 485.

The force generated by a spring may be measured by its load. The load for a given spring is the amount of force generated by a spring at a specific distance traveled, represented by the equation: Load=Rate×distance traveled, wherein the rate is the amount of force generated by the spring for a given amount of deflection. In certain valve applications, an increased output load at the end of the spring stroke may be advantageous to clear debris or cut obstructions that may be across a valve at the time when a closure (e.g. a fail-safe closure) may occur. In such applications, using variable load springs in the valve actuator 400 may provide the desired increased output at the end of the activation stroke, and in some embodiments, extending variable load springs in sequence. In some embodiments, the second spring 485 may have a spring load greater than the spring load of the first spring 480. In this embodiment, the first spring 480 may be a moderate load, longer stroke stack spring having a spring load of about 8,000 to 10,000 lb, such as a nested spring. The initial load is shown by arrow $A^1$, wherein the first spring 480 is resting against the expandable ring 475, which in turn is directly translating the initial load $A^1$ to the inner mandrel 430. The second spring 485, in some embodiments, may be a high load, short stroke stack with a spring load of at least about 30,000 lb, such as, e.g. a Belleville spring, providing a higher load, but a shorter stroke. In the illustrated embodiment, the axial load is shown by arrow A and the radial force is shown by arrow B).

Figure 4B:
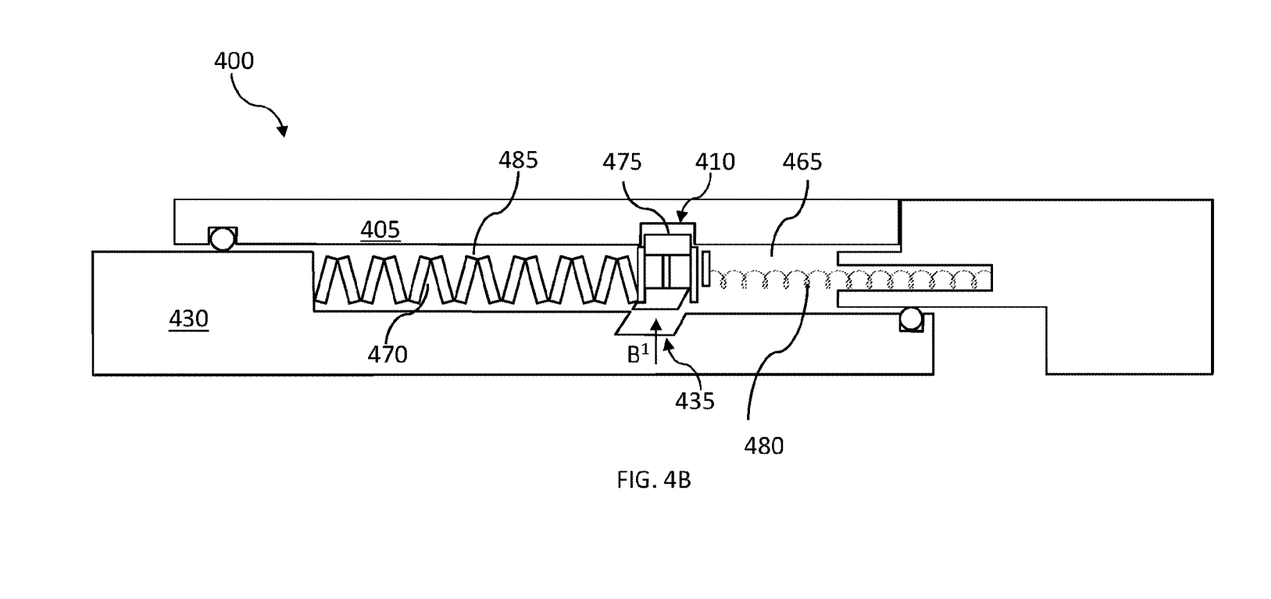

Referring now to FIG. 4B, there is shown the valve actuator 400 in a second operational state, wherein the first spring 480 is activated, exerting a moderate load stack stroke, indicated by arrow $A^1$, moving the inner mandrel 430 toward the valve 200. As the inner mandrel 430 moves toward the valve 200, the expandable ring 475 is pushed radially outward by the first and/or second inner sidewalls 445, 450. As the inner mandrel 430 continues to slide relative to the outer mandrel 405, the inner and outer notches 435, 410 line up. At the moment the inner notch 435 lines up with the outer notch 410, the radial force $B^1$ presses the expandable ring 475 radially outward such that it engages with the outer notch 410. With the expandable ring 475 in the outer notch 410, the first spring 480 has completed its full stroke.

Figure 4C:
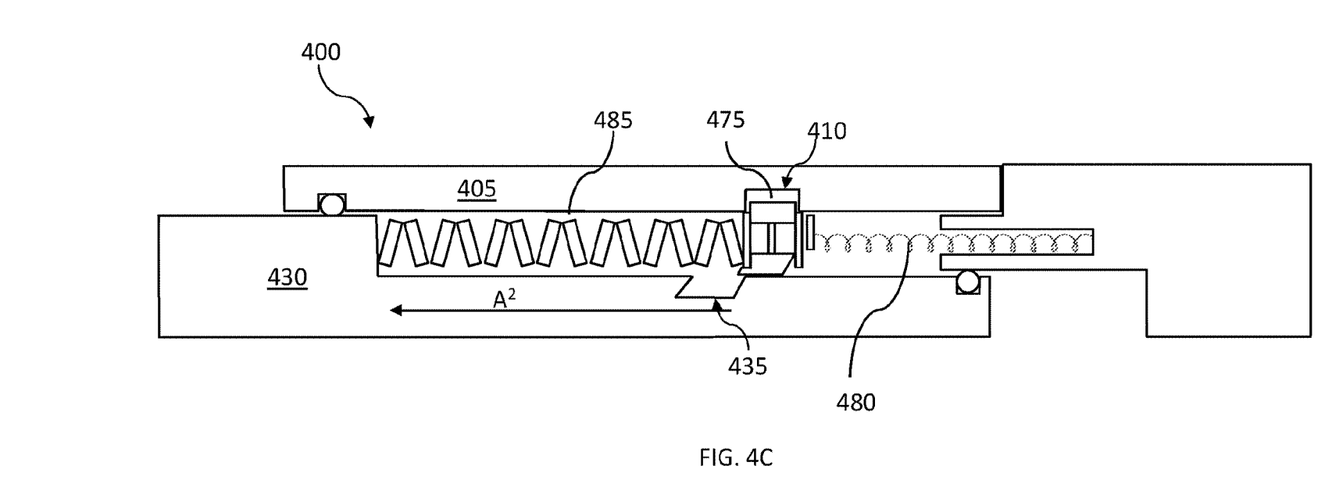

Referring now to FIG. 4C, there is shown the valve actuator 400 in a next operational state, wherein the second spring 485 is activated, pushing the inner mandrel 430 toward the valve 200 to close the valve 200, exerting a secondary load indicated by arrow $A^2$. For example, with the expandable ring 475 in the outer notch 410, the secondary load $A^2$ is now directly translated to the inner mandrel 430. The second spring 485, as discussed hereinabove, may in some embodiments, be a high load, short stroke spring. For example, the second spring 485, in one embodiment, may be a Belleville or similar stacked spring, capable of providing an increased load at the end of the spring stroke to clear any debris or obstructions to provide a positive valve closure. As indicated above, the inner mandrel 430 may be coupled with a control arm, such as control arm 210 of valve 200. At this stage, the valve would be closed, and any debris or obstructions would have been severed.

Figure 4D:
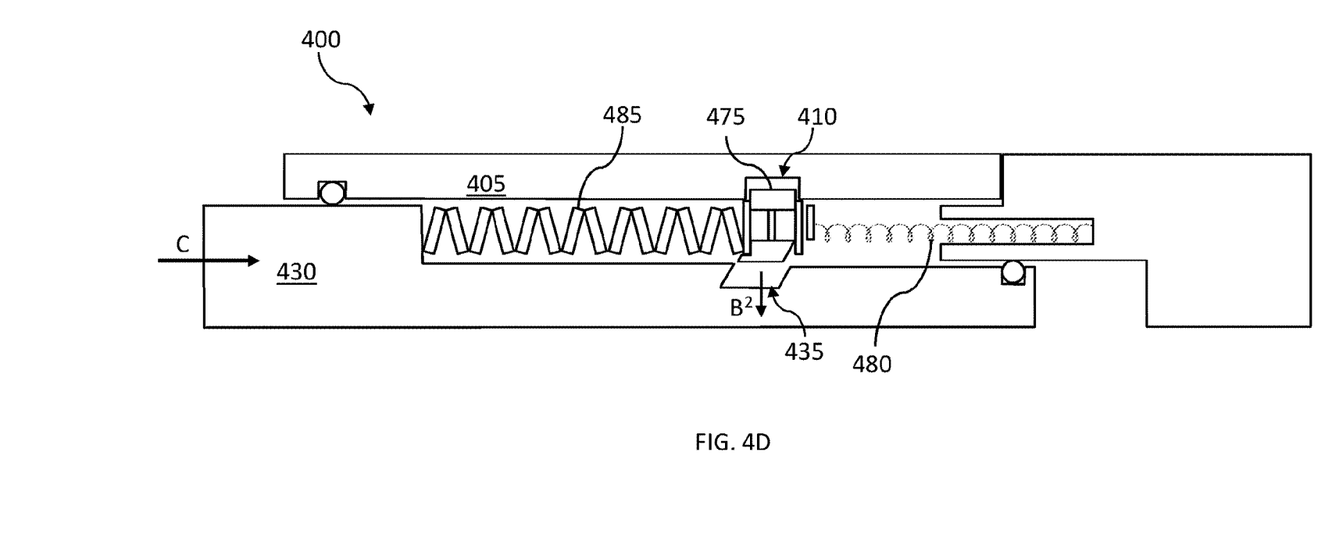
Figure 4E:
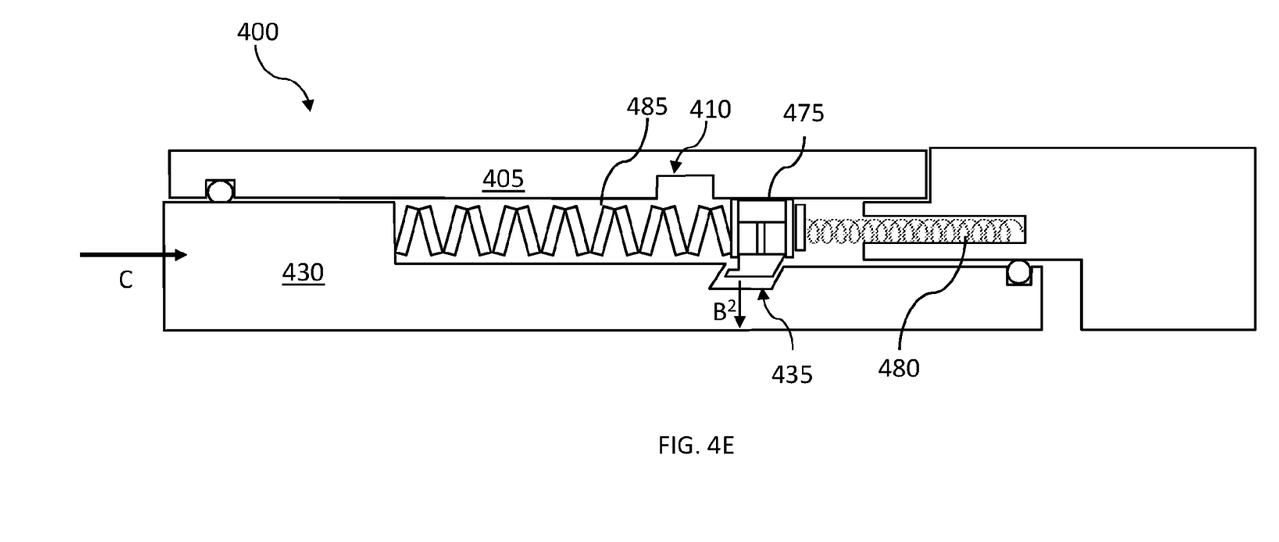

Referring now to FIGS. 4D-4E, there is shown the valve actuator 400 as it is being retracted (e.g., compressed in the illustrated embodiment). For example, FIG. 4D illustrates the valve actuator as it is just being compressed, whereas FIG. 4E illustrates the valve actuator 400 as it is approaching being fully compressed. In one embodiment, hydraulic pressure is reapplied to create an axial force to re-set and reopen the valve 200. The inner mandrel 430 is pushed away from the valve 200 by an axial force, represented by arrow C, recompressing the second spring 485. As the expandable ring 475 is in the outer notch 410, all of the initial axial force C is used to compress the second spring 485. When the inner notch 435 lines up below the outer notch 410, the radial load, shown by arrow $B^2$, shifts the expandable ring 475 radially "down" or radially inward into the inner notch 435, enabling the inner mandrel 430 to continue moving away from the valve. As the expandable ring 475 is now in the inner notch 435, all of the remaining axial force C is now being used to compress the first spring 480. Hydraulic pressure continues to be applied, moving the inner mandrel 430 away from the valve 200 until the inner mandrel 430 limits out on the top mandrel 405, at which time the first spring 480 is fully recompressed and the valve 200 is fully open.

Figure 5A:
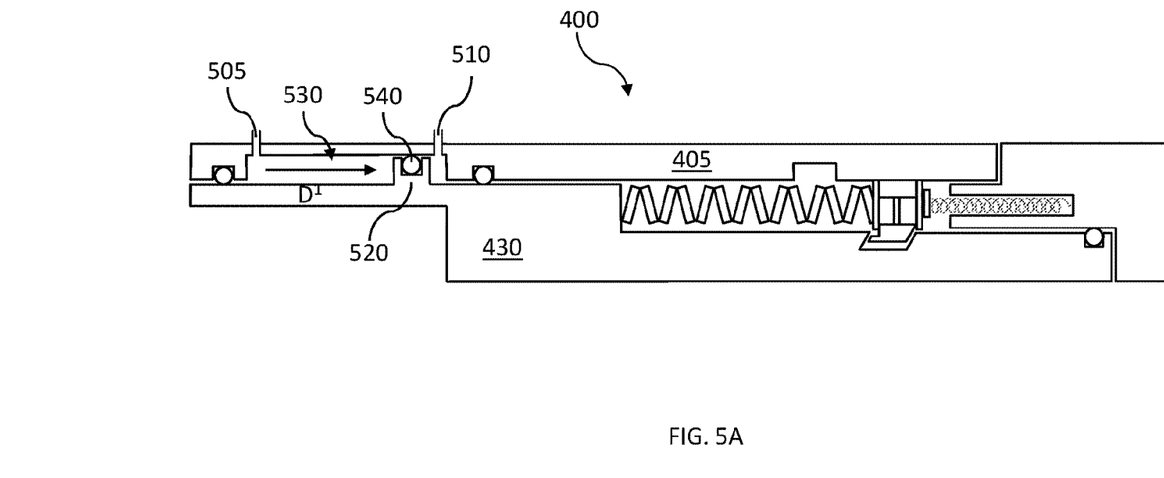
FIGS. 5A-5B illustrate a section view of the valve actuator of FIGS. 4A-4E shown in conjunction with hydraulic open and close lines according to the principles of the present disclosure.
Figure 5B:
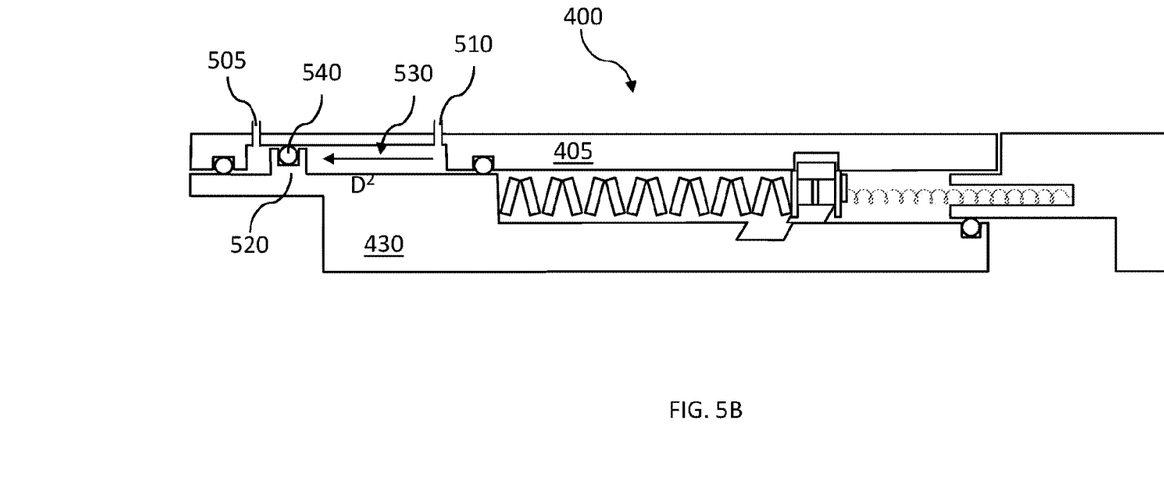

Referring now to FIGS. 5A and 5B, there is shown one embodiment of the valve actuator 400 shown in conjunction with a hydraulic open line 505 and a hydraulic closed line 510, of which can be used with a piston 520 located within a divided pressure chamber 530. A seal 540, in this embodiment, may exist between the piston 520 and the upper mandrel 405, thereby providing separation between the different chambers of the divided pressure chamber 530. Typically, the hydraulic open line 505 drives the piston away from the valve (e.g., right in this depiction) to open the valve, and the hydraulic closed line 510 driving the piston toward the valve (e.g., left in this depiction) to close the valve. If, however, the hydraulic open and/or closed lines 505, 510 are severed for any reason, the valve actuator 400 could close the valve. Additionally, the valve actuator 400 may work in conjunction with the hydraulic open and closed lines 505, 510 to provide added force at the end the closing stroke as discussed herein. In FIG. 5A, a valve, such as valve 200 is open, and the hydraulic open line 505 has a higher pressure than the hydraulic closed line 510. As shown in this embodiment, the higher pressure from the hydraulic open line 505 exerts an axial force $D^1$ pushing the inner mandrel 430 away from the valve, maintaining the valve open. In FIG. 5B, the closed hydraulic line 510 is shown having a higher pressure than the hydraulic open line 505, exerting an axial force $D^2$, closing the valve. The inner mandrel 430, as shown in this embodiment, may be configured to move relative to the hydraulic open line 505 and the hydraulic close line 510 as the valve opens and closes. In some embodiments, the inner mandrel 430 may be coupled with a control arm of the valve, such as control arm 210.

Aspects disclosed herein include:

A. A valve actuator for use with a valve. The valve actuator, in one embodiment, includes an outer mandrel having an outer notch in an inner radial surface of the outer mandrel; an inner mandrel having an inner notch in an outer radial surface of the inner mandrel, wherein the outer mandrel and the inner mandrel together define a spring chamber having a first and second portion; an expandable ring separating the first and second portions of the spring chamber; a first spring positioned in the first portion of the spring chamber; and a second spring positioned in the second portion of the spring chamber, the first and second springs configured to sequentially extend to move a control arm to close a valve.

B. A valve assembly. The valve assembly, in one embodiment, includes: a valve member configured to control flow through the valve body; a control arm coupled with the valve member, the control arm configured to move the valve member between at least a first valve open position and a second valve closed position; and a valve actuator coupled to the control arm, the valve actuator including: an outer mandrel having an outer notch in an inner radial surface of the outer mandrel; an inner mandrel having an inner notch in an outer radial surface of the inner mandrel, wherein the outer mandrel and the inner mandrel together define a spring chamber having a first and second portion; an expandable ring separating the first and second portions of the spring chamber; a first spring positioned in the first portion of the spring chamber; and a second spring positioned in the second portion of the spring chamber, the first and second springs configured to sequentially move the control arm to move the valve between the first open position and the second closed position.

C. A method for actuating a valve between an open position and a closed position. The method, in one embodiment, includes: placing a valve assembly within a conduit, the valve assembly including: a valve body; a valve member configured to control flow through the valve body; a control arm coupled with the valve member, the control arm configured to move the valve member between at least a first valve open position and a second valve closed position; and a valve actuator coupled to the control arm, the valve actuator including: an outer mandrel having an outer notch in an inner radial surface of the outer mandrel; an inner mandrel having an inner notch in an outer radial surface of the inner mandrel, wherein the outer mandrel and the inner mandrel together define a spring chamber having a first and second portion; an expandable ring separating the first and second portions of the spring chamber; a first spring positioned in the first portion of the spring chamber; and a second spring positioned in the second portion of the spring chamber, the first and second springs configured to sequentially move the control arm to move the valve between the first open position and the second closed position; and triggering the valve actuator to release the first spring and then release the second spring to move the control arm such that the control arm moves the valve member to the second valve closed position.

Aspects A, B, and C may have one or more of the following additional elements in combination:

Element 1: wherein the inner notch has one or more inner notch sidewalls, wherein at least one of the one or more inner notch sidewalls is angled toward the first spring. Element 2: wherein the inner notch has two opposing substantially parallel inner notch sidewalls. Element 3: wherein the outer notch has one or more outer notch sidewalls that are substantially perpendicular to the inner radial surface of the outer mandrel. Element 4: wherein the first spring is a nested spring. Element 5: wherein the second spring is a Bellville spring. Element 6: wherein the first spring is configured to sequentially release before the second spring, and further wherein a spring load of the second spring is greater than a spring load of the first spring. Element 7: wherein the valve is a ball valve. Element 8: wherein the first spring axially moves the inner mandrel to a first position allowing the expandable ring to move radially outward into the outer notch, and then the second spring axially moves the inner mandrel to a second position.

Those skilled in the art to which this application relates will appreciate that other and further additions, deletions, substitutions and modifications may be made to the described embodiments.

What is claimed is:

1. A valve actuator, comprising:
   an outer mandrel having an outer notch in an inner radial surface of the outer mandrel;
   an inner mandrel having an inner notch in an outer radial surface of the inner mandrel, wherein the outer mandrel and the inner mandrel together define a spring chamber having a first and second portion;
   an expandable ring separating the first and second portions of the spring chamber, the expandable ring configured to move radially between the inner notch to the outer notch as the outer and inner mandrel move relative to one another;
   a first spring positioned in the first portion of the spring chamber; and
   a second spring positioned in the second portion of the spring chamber, the first and second springs configured to sequentially extend to move a control arm to close a valve.

2. The valve actuator according to claim 1, wherein the inner notch has one or more inner notch sidewalls, wherein at least one of the one or more inner notch sidewalls is angled toward the first spring.

3. The valve actuator according to claim 2, wherein the inner notch has two opposing substantially parallel inner notch sidewalls.

4. The valve actuator according to claim 1, wherein the outer notch has one or more outer notch sidewalls that are substantially perpendicular to the inner radial surface of the outer mandrel.

5. The valve actuator according to claim 1, wherein the first spring is a nested spring.

6. The valve actuator according to claim 1, wherein the second spring is a Bellville spring.

7. The valve actuator according to claim 1, wherein the first spring is configured to sequentially release before the second spring, and further wherein a spring load of the second spring is greater than a spring load of the first spring.

8. A valve assembly, comprising:
  a valve body;
  a valve member configured to control flow through the valve body;
  a control arm coupled with the valve member, the control arm configured to move the valve member between at least a first valve open position and a second valve closed position; and
  a valve actuator coupled to the control arm, the valve actuator including:
    an outer mandrel having an outer notch in an inner radial surface of the outer mandrel;
    an inner mandrel having an inner notch in an outer radial surface of the inner mandrel, wherein the outer mandrel and the inner mandrel together define a spring chamber having a first and second portion;
    an expandable ring separating the first and second portions of the spring chamber the expandable ring configured to move radially between the inner notch to the outer notch as the outer and inner mandrel move relative to one another;
    a first spring positioned in the first portion of the spring chamber; and
    a second spring positioned in the second portion of the spring chamber, the first and second springs configured to sequentially move the control arm to move the valve member between the first open position and the second closed position.

9. The valve assembly according to claim 8, wherein the inner notch has one or more inner notch sidewalls, wherein at least one of the one or more inner notch sidewalls is angled toward the first spring.

10. The valve assembly according to claim 9, wherein the inner notch has two opposing substantially parallel inner notch sidewalls.

11. The valve assembly according to claim 8, wherein the outer notch has one or more outer notch sidewalls that are substantially perpendicular to the inner radial surface of the outer mandrel.

12. The valve assembly according to claim 8, wherein the first spring is a nested spring.

13. The valve assembly according to claim 8, wherein the second spring is a Bellville spring.

14. The valve assembly according to claim 8, wherein the valve member is a ball valve.

15. The valve assembly according to claim 8, wherein the first spring is configured to sequentially release before the second spring, and further wherein a spring load of the second spring is greater than a spring load of the first spring.

16. A method for actuating a valve between an open position and a closed position, the method comprising:
  placing a valve assembly within a conduit, the valve assembly including:
    a valve body;
    a valve member configured to control flow through the valve body;
    a control arm coupled with the valve member, the control arm configured to move the valve member between at least a first valve open position and a second valve closed position; and
    a valve actuator coupled to the control arm, the valve actuator including:
      an outer mandrel having an outer notch in an inner radial surface of the outer mandrel;
      an inner mandrel having an inner notch in an outer radial surface of the inner mandrel, wherein the outer mandrel and the inner mandrel together define a spring chamber having a first and second portion;
      an expandable ring separating the first and second portions of the spring chamber, the expandable ring configured to move radially between the inner notch to the outer notch as the outer and inner mandrel move relative to one another;
      a first spring positioned in the first portion of the spring chamber; and
      a second spring positioned in the second portion of the spring chamber, the first and second springs configured to sequentially move the control arm to move the valve member between the first open position and the second closed position; and
  triggering the valve actuator to release the first spring and then release the second spring to move the control arm such that the control arm moves the valve member to the second valve closed position.

17. The method for actuating a valve according to claim 16, wherein the inner notch has one or more inner notch sidewalls, wherein at least one of the one or more inner notch sidewalls is angled toward the first spring.

18. The method for actuating a valve according to claim 17, wherein the inner notch has two opposing substantially parallel inner notch sidewalls.

19. The method for actuating a valve according to claim 16, wherein the first spring axially moves the inner mandrel to a first position allowing the expandable ring to move radially outward into the outer notch, and then the second spring axially moves the inner mandrel to a second position.

20. The method for actuating a valve according to claim 16, wherein a spring load of the second spring is greater than a spring load of the first spring.

* * * * *